United States Patent

[11] 3,530,914

[72] Inventor William Lasar
 Long Beach, California 90802
[21] Appl. No. 867,111
[22] Filed Sept. 19, 1969
 Division of Ser. No. 700,815, Jan. 26, 1968, abandoned
[45] Patented Sept. 29, 1970

[54] MEAT FLAKER
 8 Claims, 8 Drawing Figs.
[52] U.S. Cl. .................................................. 146/92, 146/123, 146/181
[51] Int. Cl. .................................................. B02c 18/00, A22c 17/00
[50] Field of Search .................................................. 146/92, 122, 123, 125, 181; 214/(Inquired)

[56] References Cited
UNITED STATES PATENTS
3,301,291  1/1967  Hughes ........................ 146/123

Primary Examiner—Willie G. Abercrombie
Attorney—Fulwider, Patton, Rieber, Lee and Utecht ABSTRACT: The meat flaker of present invention includes a cabinet supporting a rotary cutting drum and formed with an upwardly opening hopper. A loading tray is pivotally connected on one end to the cabinet and has its free end coupled with a double acting air cylinder which raises and lowers such tray. A vertically traveling pressure plate is also connected with the free end of the loading tray whereby a block of meat may be placed on the tray, the cylinder activated to raise the free end of such tray to feed the meat block into the hopper and under the pressure plate, and the cylinder reversed to lower the pressure plate and press the meat block downwardly against the cutting drum while lowering the tray for receiving the next block of meat.

Patented Sept. 29, 1970

INVENTOR.
WILLIAM LASAR
BY Fulwider, Patton, Rieber,
Lee, and Utecht
ATTORNEYS

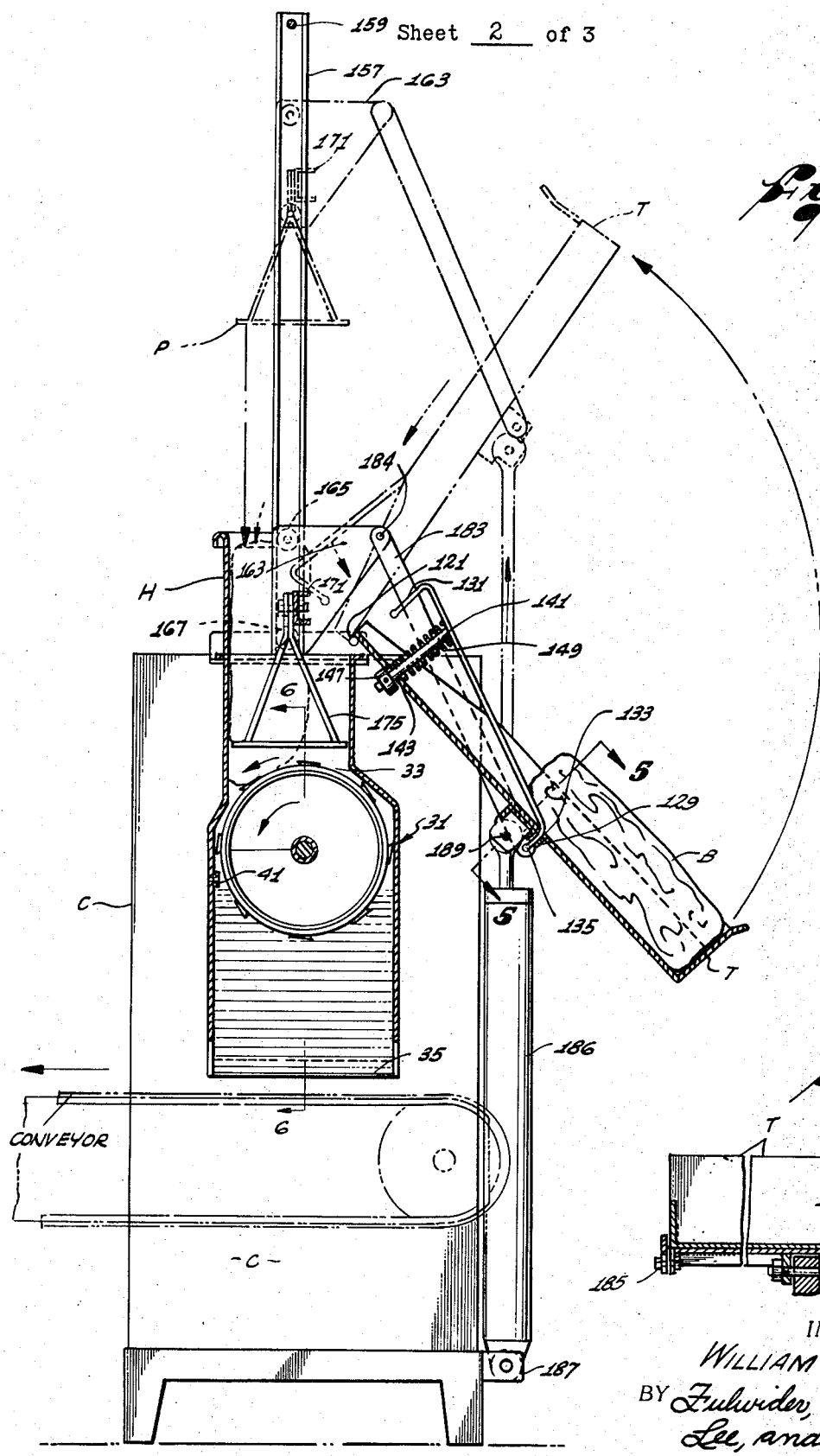

Patented Sept. 29, 1970

INVENTOR.
WILLIAM LASAR
BY Fulwider, Patton, Rieber
Lee, and Utecht
ATTORNEYS

MEAT FLAKER

CROSS REFERENCE TO RELATED APPLICATIONS

This application is a divisional application of my co-pending application Ser. No. 700,815, filed January 26, 1968, now abandoned.

BACKGROUND OF THE INVENTION

1. Field of the Invention

The present invention relates to a device for rapidly cutting a large block of meat into relatively small flakes of meat.

2. Description of the Prior Art

There are no prior art meat flakers known to applicant which include loading trays that are elevatable to feed a block of meat into the flaker and against a cutting drum and which are coupled with a pressure plate which forces the meat block against the drum when the tray is lowered to thereby force feed the flaker for rapid flaking of the block.

SUMMARY OF THE INVENTION

The meat flaker of present invention is characterized by a cabinet which mounts a cutting drum and is formed with a hopper for receipt of blocks of meat to be fed against such drum. A movable loading tray is carried by the cabinet and drive means is provided for moving such tray between a lower block-receiving position to a raised block-loading position. A pressure plate is coupled with the tray for being moved clear of the hopper for receipt therein of a block of meat when the tray is moved to its block-loading position and for being moved toward the cutting means when the tray is moved back to its block-receiving position to thereby force the block in said hopper against the cutting means.

An object of the present invention is to provide a meat flaker of the type described which force feeds blocks of meat into the cutting means.

Another object of the present invention is to provide a meat flaker of the type described wherein the pressure plate is formed to block the hopper during feeding of the meat block into the cutter means to restrict access to the cutter means.

Other objects and features of the invention will become apparent from consideration of the following description taken in connection with the accompanying drawings.

DESCRIPTION OF THE DRAWINGS

FIG. 4 is a vertical sectional view, in enlarged scale, taken along the lines 4-4 of FIG. 1;

FIG. 5 is a broken sectional view taken along the lines 5-5 of FIG. 4;

DESCRIPTION OF THE PREFERRED EMBODIMENT

Figure 6:
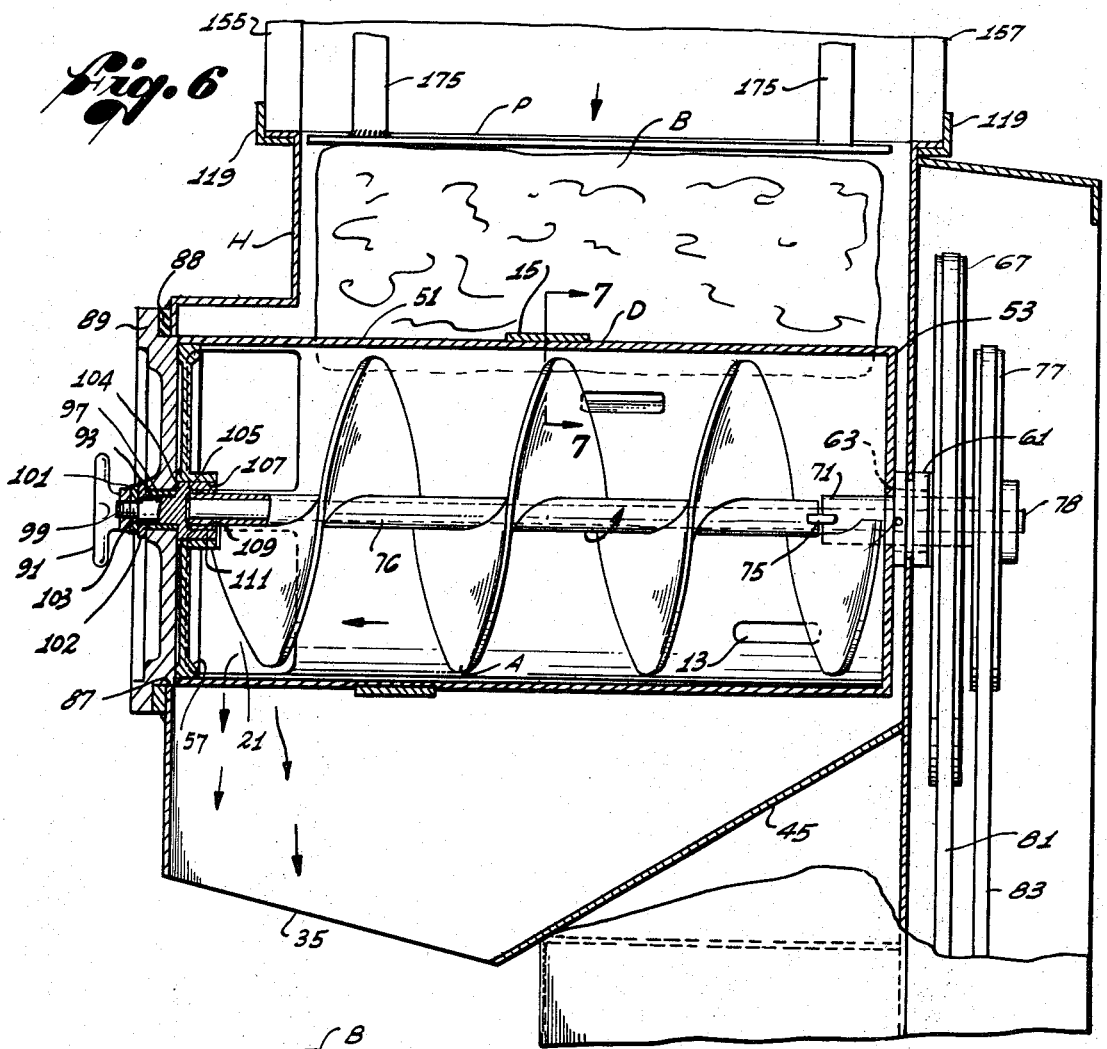
FIG. 6 is a broken vertical sectional view, in enlarged scale, taken along the lines 6-6 of FIG. 4.
Figure 7:
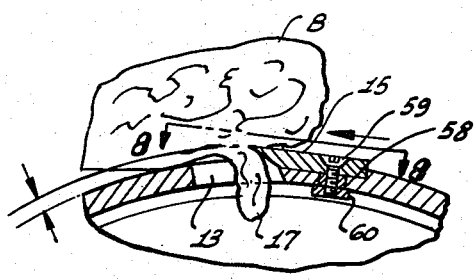
FIG. 7 is a broken vertical sectional view, in enlarged scale, taken along the lines 7-7 of FIG. 6.
Figure 8:
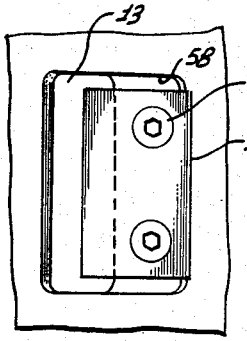
FIG. 8 is a broken horizontal sectional view taken along the lines 8-8 of FIG. 7.

Referring to FIG. 6, the meat flaker of present invention includes a hollow drum D which has a plurality of flake-receiving apertures 13 in its circumferential wall. Referring to FIG. 7, a plurality of blades 15 are mounted behind the apertures 13 for shearing flakes 17 from blocks of meat B. The flakes 17 are received inside the drum D and are pushed out the drum openings 21. The blocks of meat B are fed into the cutter drum D by means of a loading tray T which, when elevated, dumps the blocks B on top of the drum D and when the tray T is lowered a pressure plate P is pressed against the top of the block B to push it firmly against the drum D.

Figure 1:
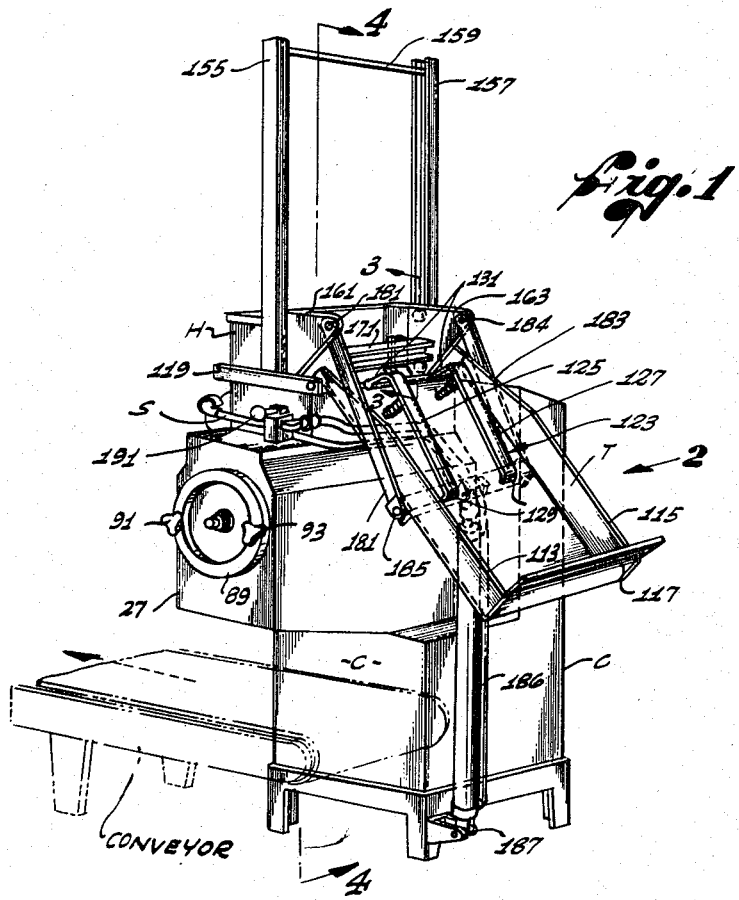
FIG. 1 is a perspective view of a meat flaker embodying the present invention.

Referring to FIG. 1, the meat flaker includes a cabinet C which forms an open bottom overhang portion 27. Referring to FIG. 4, a meat chamber, generally designated 31, is mounted within the cabinet C and includes an inlet 33 and an outlet 35 formed by the open bottom of the overhang portion 27. The cutter drum D is mounted in the cutter chamber 31 and the blades 15 are passed within a predetermined distance of a slicing bar 41 affixed to one wall of the chamber 31. Referring to FIG. 6, the inner portion of the cutter chamber 31 includes a downwardly sloped bottom wall 45 which terminates in the outlet 35 of the cutter chamber.

As shown particularly in FIG. 4, a meat hopper H is formed above the cutter chamber 31 for receiving blocks of meat B to be fed into the drum D.

Referring to FIG. 6, the drum D includes a cylindrical wall 51 in which the apertures 13 are formed and has its right-hand end closed by a end plate 53. The left-hand end of the drum D is open and receives a removable end plate 57 which fits snugly within the cylindrical wall 51. The blades 15 are disposed in depressions 58 formed adjacent the apertures 13 and are fastened to the drum D by counter-sunk screws 59 screwed into inserts 60.

With continued reference to FIG. 6, a feed screw A is disposed in the drum D for feeding the meat flakes longitudinally therein and out the outlets 21.

Figure 2:
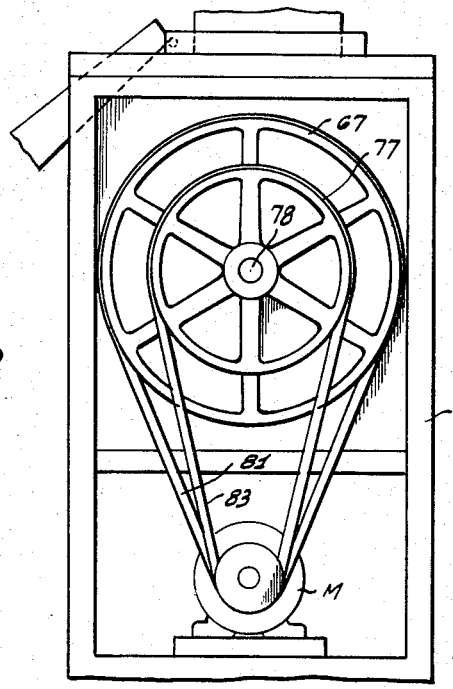
FIG. 2 is a side view, in enlarged scale, of the meat flaker shown in FIG. 1.

A flange 61 is mounted in the right-hand wall of the cutter chamber 31 and has a sleeve 63 journaled therethrough for connection with the end wall 53 of the drum D. The outer extremity of the sleeve 63 mounts a relatively large driven pulley 67 for effecting rotation of the drum D. A second sleeve 71 is journaled through the sleeve 63 and includes a pair of open-ended notches on its inner extremity for receiving a pair of keys 75 formed on the shaft 76 of the feed screw A. A shaft 78 is fitted into the outer extremity of the sleeve 71 and mounts a relatively small driven pulley 77 for effecting rotation of the feed screw A. The pulleys 67 and 77 are driven by a motor M (FIG. 2) through a pair of endless belts 81 and 83, respectively.

With continued reference to FIG. 6, the cutter chamber 31 includes an access opening 87, which is surrounded by an aligning ring 88, which confronts the left-hand end of the drum D. Referring to FIG. 1, a hatch cover, or door, 89 normally covers the opening 87 and is locked in place by means of a pair of hold-down latches 91 and 93. The cover 89 is stepped at 90 to form a circular projection 92 for being received within the locating ring 88. A bore is formed in the center of the hatch cover 89 for receiving a bearing 93 into which is journaled the small end of a bearing fitting 95. The portion 97 of the bearing fitting 95 extending through the door 89 is slightly longer than the thickness of the door and is longitudinally slidable in the bearing 93, for a purpose which will appear hereinafter. The outer extremity of the fitting 95 is in the form of a stud 99 which receives a mounting nut 101, under which lies a washer 102 tightened against a shoulder 103.

The fitting 95 is enlarged in diameter to form a shoulder 104 for abutting the inner surface of the door 89 and the enlarged portion 105 is pressed into a bore 107 in the removable end plate 57. A bore 109 extends in from the large end of the fitting 95 and a bearing 111 is pressed thereinto for receiving the end of the feed screw shaft 76.

Referring to FIGS. 1 and 4, the tray T includes a pair of oppositely disposed side walls 113 and 115 and an end wall 117. The tray T is pivotally connected to a pair of angles 119 welded to the cabinet C by means of a pair of bolts 121.

With continued reference to FIGS. 1 and 4, a guide, generally designated 123, is mounted on the tray T and includes a pair of parallel slides 125 and 127. The slides 125 and 127 include turned-down extremities 129 and 131, the extremities 129 projecting through a slot 133 (FIG. 4) in the tray T and being attached to a mounting bolt 135. The free ends of the slides 125 and 127 are connected to the tray T by bolts 141 which project slidably through bores 143 in the tray T. The lower ends of the bolts 141 receive nuts 147 and a compression spring 149 is interposed between the tray T and the respective slides 125 and 127 to maintain the slides biased away from the tray T.

Figure 3:
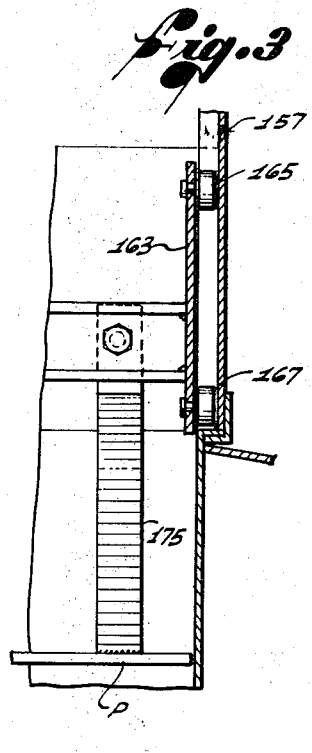
FIG. 3 is a broken vertical sectional view, in enlarged scale, taken along the lines 3-3 of FIG. 1.

A pair of upwardly-projecting inwardly-facing tracks in the form of channels 155 and 157 are affixed to the top of the cabinet C and have their upper ends connected together by a rod 159. referring to FIG. 3, the pressure plate P is suspended from a pair of brackets 161 and 163 which mount a pair of rollers 165 and 167 received in the channels 155 and 157. The brackets 161 and 163 are connected together by a channel member 171 and the plate P is suspended from the channel member by means of a pair of A-shaped frames 175.

Referring to FIGS. 1 and 5, a pair of links 181 and 183 are pivotally connected on one extremity to the mounting brackets 161 and 163 by bolts 184 and on the opposite extremities the tray T by bolts 185. Thus, when the tray is raised to the position shown in broken lines in FIG. 4, the links 181 and 183 push the brackets 161 and 163 upwardly in the channels 155 and 157 thus raising the pressure plate P. The tray T and pressure plate P are raised and lowered by means of an air cylinder 186 which is pivotally connected on its lower extremity to a mounting bracket 187 on the cabinet C and on its upper extremity to a tray bracket 189. Referring to FIG. 1, a pneumatic system S is provided for actuating the cylinder 186 and includes a control handle 191 for raising and lowering the tray T.

In operation, the motor M is started to effect rotation of the cutter drum D and feed screw A. Since the pulley 77 driving the feed screw A is smaller than the pulley 67 driving the cutter drum D, the feed screw will be driven at a faster rate of speed than the drum D. The blocks of meat B to be flaked are frequently frozen and it is desirable to flake the meat before the blocks become thawed to avoid danger of quality deterioration. The blocks of meat B are placed on the tray T and the control handle 191 pressed to raise the tray T, and concurrently raise the pressure plate P, to the positions shown in broken lines in FIG. 4. The blocks of meat B will slide down the raised tray T and over the guide 123 weighting the slides 125 and 127 down and slightly compressing the springs 149. As shown in FIG. 4, the slides 123 and 125 direct the falling block of meat B to the side of the hopper H toward which the drum D is turning and hold it there to avoid such block being moved around in the hopper by the force of the turning drum D. The tray T is then lowered for receiving another block of meat B and at the same time the pressure plate P is brought down into contact with the top of the block of meat in the hopper H and presses the meat firmly against the cutter drum D. Each of the cutters 15 will shear off a flake of meat and direct it inwardly through the apertures 13. The rotating feed screw A will then push the flakes of meat longitudinally in the drum D and out the openings 21 and they will be received on a conveyor disposed beneath the cutter chamber outlet 35.

The distance which the cutting block 41 is spaced from the rotating blades 17 determines the maximum thickness to which a flake of meat can be cut.

While a block of meat is being flaked, another block of meat B will be placed on the tray T and the tray raised to elevate the pressure plate P and enable the second block of meat to be deposited on the block of meat being cut by the drum D. The tray T will again be lowered to bring the pressure plate P to bear on the second block of meat and flaking of the first block will be finished and flaking of the second will be started. It is of particular importance that the pressure plate P essentially blocks access to the hopper H and cutter drum D when it is in its lowered position thereby preventing individuals working in the area from inadvertently placing their hands against the cutter drum D.

When a flaking operation has been completed and it is desirable to clean the flaker, the hatch cover 89 and end plate 57 are removed by releasing the latches 91 and 93. The feed screw A is then disengaged from the sleeve 71 and pulled free of the drum D. The feed screw A can then be placed in a bath and cleaned of all meat scraps. While the feed screw A is removed from the drum D, convenient access can be had to the interior of the drum D to facilitate cleaning thereof. Since the cover 89 is slidable on the fitting portion 97, the area between the cover 89 and drum cover 57 is accessible for cleaning.

From the foregoing description it will be apparent that the meat flaker of present invention is straightforward in design and sturdy in construction. The hollow cutter drum provides for rapid cutting and positive removal of the cut flakes. The meat flaker is convenient to manufacture and use, and can be thoroughly and easily cleaned.

Various modifications and changes may be made with regard to the foregoing detailed description without departing from the spirit of the invention or the scope of the following claims.

I claim:
1. A meat flaker comprising:
   a cabinet formed with a cutting chamber and a meat hopper leading thereto;
   meat cutting means carried in said chamber;
   a loading tray movable from a meat-receiving position to a meat-loading position;
   mounting means mounting said tray on said cabinet;
   a pressure plate for forcing said meat block into said cutting means;
   coupling means for coupling said pressure plate with said loading tray for backing said plate away from said cutting means when said loading tray is moved to its meat loading position and for advancing said pressure plate toward said cutting means when said tray is moved to its meat-receiving position; and
   drive means for moving said loading tray between said meat-receiving position and said meat-loading position whereby said tray may be moved to said meat-receiving position, a block of meat placed thereon, said tray moved to its loading position to feed said block into said hopper and said tray moved back to its meat-receiving position to advance said pressure plate toward said cutting means to force said block of meat into said cutting means.

2. A meat flaker as set forth in claim 1 wherein said coupling means includes a track mounted on said cabinet and a follower connected to said pressure plate and engaged with said track.

3. A meat flaker as set forth in claim 1 wherein:
   said mounting means includes means for pivotally connecting one end of said tray to said cabinet; and
   said drive means includes a fluid cylinder connected with the free end of said loading tray.

4. A meat flaker as set forth in claim 1 wherein said drive means powers said loading tray between said loading position and said meat-receiving position to power said pressure plate against a block of meat being fed into said cutting means.

5. A meat flaker as set in claim 1 wherein:
   said hopper is disposed above said cutting means and is open on its top end; and
   said mounting means pivotally mounts one end of said tray to said cabinet whereby the free end of said tray will be pivoted from a lower position at said meat-receiving position to an upper position at said meat-loading position.

6. A meat flaker as set forth in claim 2 wherein:
   said mounting means includes means for pivotally connecting one end of said tray to said cabinet; and
   said drive means includes a fluid cylinder connected with the free end of said loading tray.

7. A meat flaker as set forth in claim 2 wherein said drive means powers said loading tray between said loading position and said meat-receiving position to power said pressure plate against a block of meat being fed into said cutting means .

8. A meat flaker as set forth in claim 3 wherein said coupling means includes a track mounted on said cabinet and a follower connected to said pressure plate and engaged with said track.